United States Patent
Mizushima

(10) Patent No.: US 8,400,930 B2
(45) Date of Patent: Mar. 19, 2013

(54) COMMUNICATION QUALITY DIAGNOSTIC UNIT

(75) Inventor: Fuyuki Mizushima, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 405 days.

(21) Appl. No.: 12/190,112

(22) Filed: Aug. 12, 2008

(65) Prior Publication Data

US 2009/0097411 A1 Apr. 16, 2009

(30) Foreign Application Priority Data

Oct. 15, 2007 (JP) ................................ 2007-267518

(51) Int. Cl.
*H04L 12/26* (2006.01)
(52) U.S. Cl. ....................................................... 370/242
(58) Field of Classification Search .................. 370/252, 370/253, 229–235, 463, 329, 334, 332, 225, 370/342, 437, 524
See application file for complete search history.

(56) References Cited

U.S. PATENT DOCUMENTS

| | | | | |
|---|---|---|---|---|
| 5,682,476 A * | 10/1997 | Tapperson et al. | ............ | 370/225 |
| 6,763,390 B1 * | 7/2004 | Kovacevic et al. | ............ | 709/231 |
| 2002/0150069 A1 * | 10/2002 | Jou et al. | ........................ | 370/335 |
| 2004/0117675 A1 * | 6/2004 | Brockhaus | ..................... | 713/300 |
| 2006/0056382 A1 * | 3/2006 | Yamada et al. | ................ | 370/349 |
| 2006/0215710 A1 * | 9/2006 | Odashima et al. | ............ | 370/535 |
| 2006/0285501 A1 * | 12/2006 | Damm | .......................... | 370/252 |
| 2007/0171829 A1 * | 7/2007 | Kojima | ......................... | 370/235 |
| 2008/0126665 A1 * | 5/2008 | Burr et al. | ...................... | 710/316 |
| 2008/0253293 A1 * | 10/2008 | Beyers | ........................... | 370/242 |
| 2009/0067324 A1 * | 3/2009 | Licardie et al. | ................ | 370/225 |

FOREIGN PATENT DOCUMENTS

JP 2006-287684 A 10/2006

* cited by examiner

*Primary Examiner* — Kevin C Harper
*Assistant Examiner* — Samina Choudhry
(74) *Attorney, Agent, or Firm* — Westerman, Hattori, Daniels & Adrian, LLP

(57) ABSTRACT

The invention achieves a communication quality diagnostic unit capable of detecting an omen phenomenon of a communication trouble early in a stage prior to actual emergence of the communication trouble due to a noise, thereby issuing a warning. The communication quality diagnostic unit for diagnosing quality of communication for transmitting and receiving frames at predetermined interval time, comprising a frame-interval time detector for monitoring interval time between the frames, a frame-interval abnormality determiner for making determination as the case of diagnostic abnormality when a predetermined threshold value is exceeded by frame-interval time as detected, and a diagnostic abnormality notifier for notifying a host unit of the diagnostic abnormality as an alarm.

8 Claims, 9 Drawing Sheets

OPERATION AT THE TIME OF TRANSMISSION

OPERATION AT THE TIME OF RECEPTION

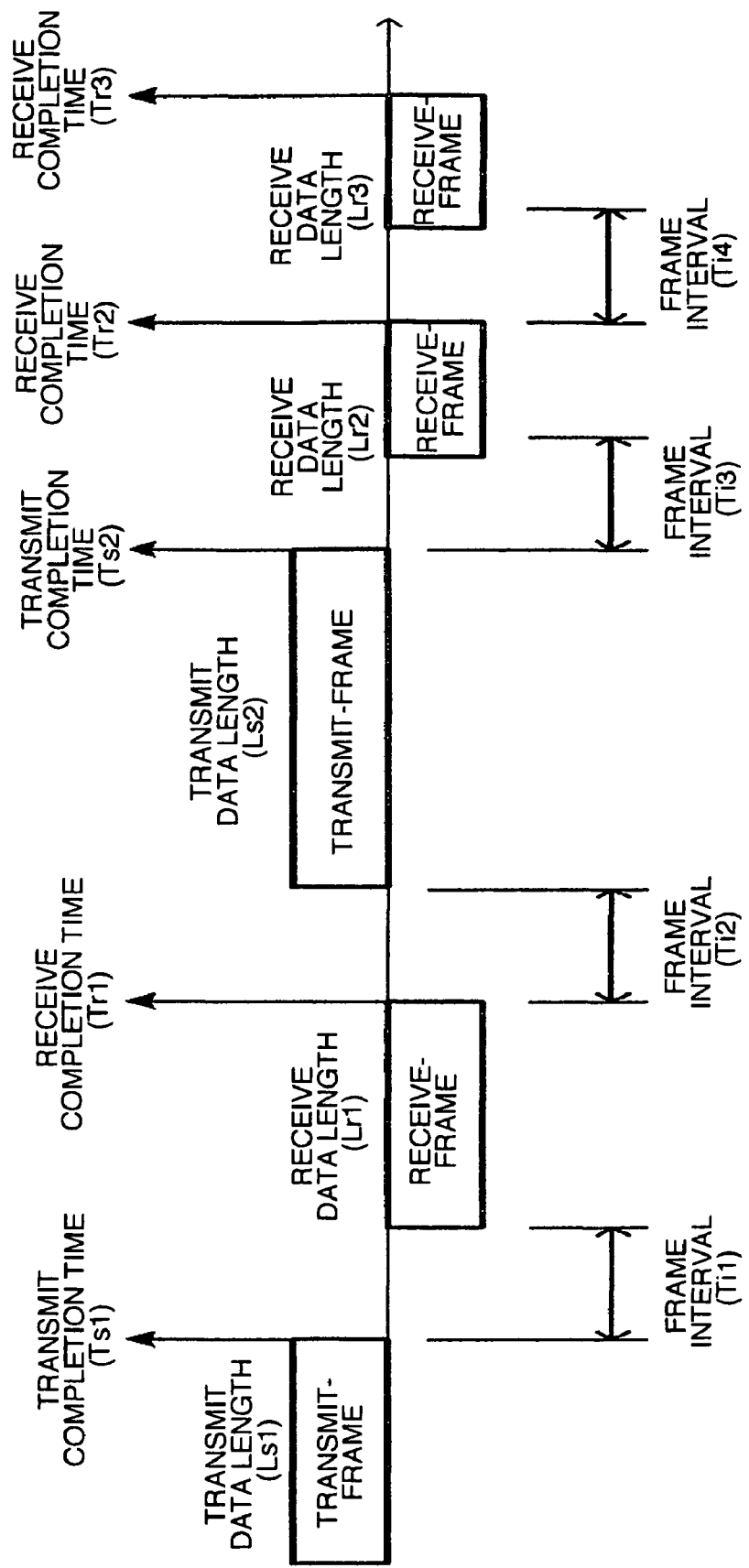

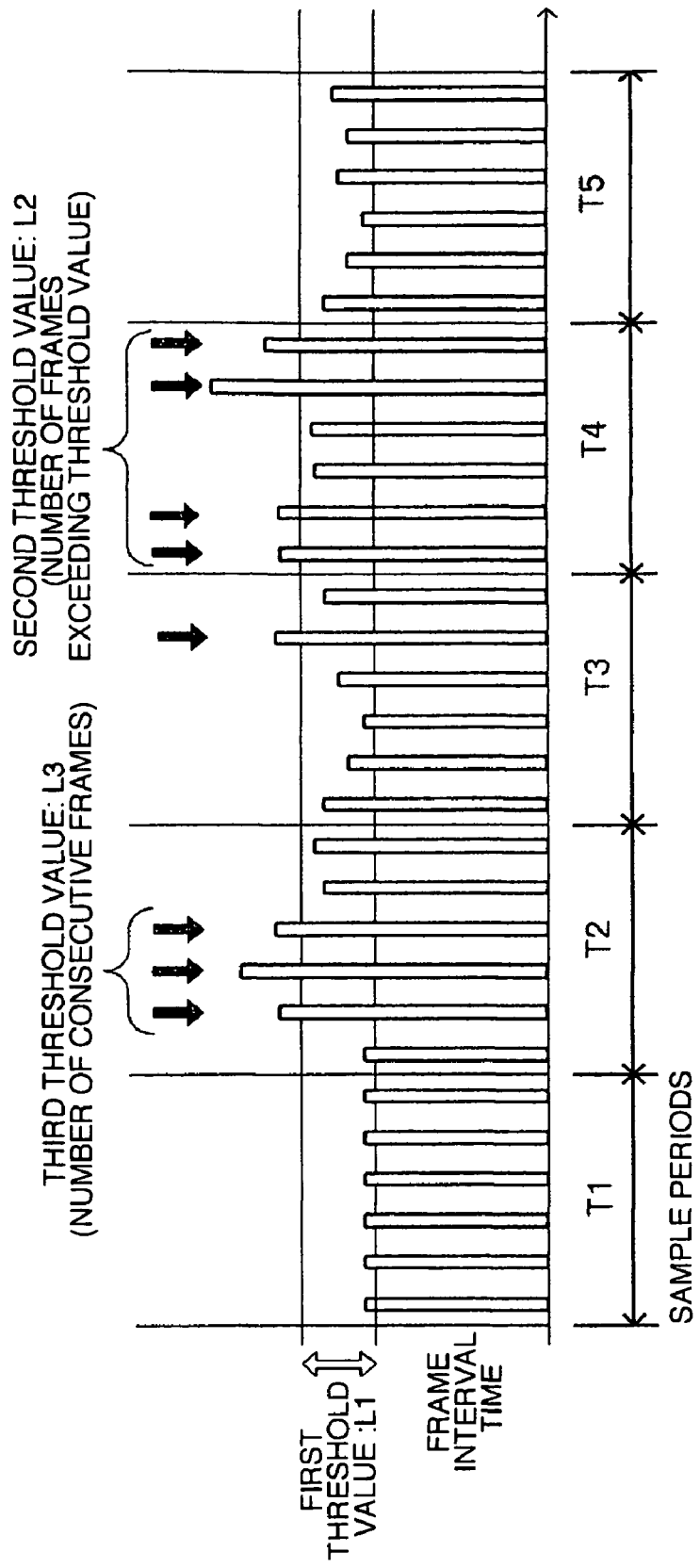

OPERATION AT THE TIME OF TRANSMISSION

OPERATION AT THE TIME OF RECEPTION

FIG. 8(A) (PRIOR ART)

WAVEFORM OF FRAME IN A NOISELESS PROPER COMMUNICATON ENVIRONMENT

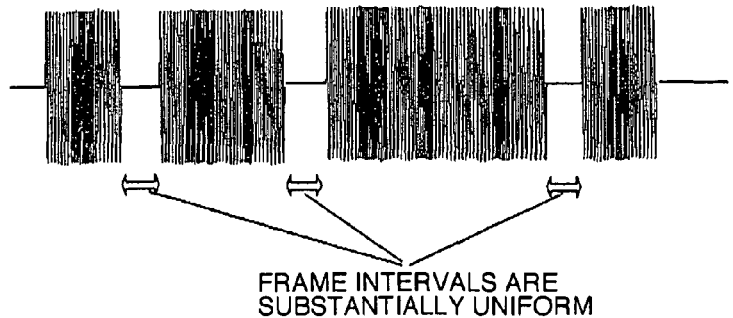

FRAME INTERVALS ARE SUBSTANTIALLY UNIFORM

FIG. 8(B) (PRIOR ART)

EXAMPLE OF EFFECT OF ONE-SHOT NOISE (PHENOMENON 1) DESTRUCTION OCCURS TO THE CONTENT OF FRAME→CRC Error

(PHENOMENON 2) FRAME INTERVALS ARE UNSTABLE (EXPAND)

FIG. 8(C) (PRIOR ART)

EXAMPLE OF EFFECT OF A NOISE MINUTE IN AMPLITUDE

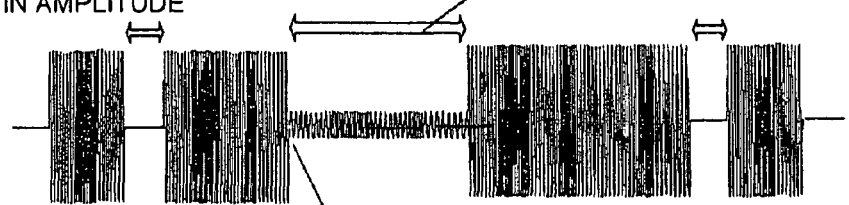

(PHENOMENON 3) SIGNAL RECEPTION ACTION IS NOT COMPLETED→Framing Error

FRAME INTERVAL IN A NOISELESS PROPER COMMUNICATON ENVIRONMENT

DISORDER IN FRAME INTERVAL IN A NOISE ENVIRONMENT

COMMUNICATION QUALITY DIAGNOSTIC UNIT

FIELD OF THE INVENTION

The invention relates to a communication quality diagnostic unit for diagnosing quality of communication for transmitting and receiving frames at predetermined interval time.

BACKGROUND OF THE INVENTION

In a process control system adopting field-buses by a two-wire bus-feed type digital communication, such as Foundation Fieldbus FF-Hi, PROFIBUS-PA, and so forth, for exchanging input/output of processes for temperature, flow rate, and so forth between fields (operation sites), and a control system, there is a demand for quality control for constantly monitoring communication quality of those field-buses, and notifying a user of deterioration in the communication quality before actual occurrence of a communication trouble so as to enable the user to take necessary countermeasures.

In the past, input/output of information was executed by a one-to-one analog signal between a controller and field equipment units such as a thermometer, a pressure transmitter, valve positioner, and so forth, respectively, however, concurrently with arrival of times when a number of pieces of information per one equipment unit can be handled in digital communication through adoption of the field-buses, it has become possible to handle a plurality of equipment units on one signal line (a segment).

For this reason, there has since been adopted a design, for example, as disclosed in the Patent Document 1 whereby field bus equipment units in number as many as possible are interconnected on one segment so as to enhance efficiency in mounting partly because a field-bus communication input-output module is expensive as compared with an analog input-output module.

FIG. 7 is a functional block diagram showing one embodiment of a conventional control system adopting a field-bus. A host unit 1 communicates with a controller 3 via a control bus 2. The controller 3 adopts a multi-drop system configuration for communication with a plurality of equipment units 6a, 6b, ..., 6n, connected to a field-bus 5 making up one segment, via a field-bus communication input-output module 4 to thereby execute control of those equipment units.

FIGS. 8(A) to 8(C) are waveform charts of frames on a field-bus, subjected to effects of a noise. FIG. 8(A) shows a waveform of frames in a state where a noise is not present on the field-bus (or a state of a voltage level within a tolerable range according to the specification). In this case, an interval between communication frames is found substantially uniform according to a field-bus specification.

FIG. 8(B) shows the effect of one-shot noise as overlaid, indicating that if the noise is overlaid in the middle of a frame, destruction occurs to the content of the frame (phenomenon 1) while if the noise is overlaid between the frames, an unstable expansion occurs to an interval between the frames (phenomenon 2.)

FIG. 8(C) shows the effect of a noise minute in amplitude, in as-overlaid state, indicating occurrence of the state of the frame intervals undergoing the unstable expansion (phenomenon 2) as with the case of FIG. 8(B), and a state of incompletion in signal reception action (phenomenon 3).

Upon frequent occurrence of those phenomena 1 to 3, it follows that communication troubles have emerged. Diagnosis on soundness of the relevant segment is made on the basis of the number of times the frame is destructed (CRC Error check).

In a stage before those phenomena occur (a stage where a noise level is still relatively low), a phenomenon of "frame interval time is unstable" as in the case of the phenomenon 3 will come to be observed on the actual bus. The reason for this is because the equipment unit of the field-bus that is about to start transmission recognizes those noises as part of the actual frame, delaying therefore timing for starting transmission in order to comply with a minimum frame-interval time according to the field-bus specification.

FIGS. 9(A) and 9(B) are time charts showing frame-intervals in disorder in a noise environment. FIG. 9(A) shows frame-interval time in a noiseless proper communication environment where frame-intervals are substantially uniform.

Meanwhile, variation occurs to the frame-interval due to delay in the timing for starting transmission owing to the noise as in the case of the phenomenon 2 even though a state of the destruction of the frame has not been reached as yet. FIG. 9 (B) shows a state of the variation occurring to the frame-intervals.

[Patent Document 1] JP 2006-287684A

In the case of input/output function making use of the field-bus, if an improper waveform as a noise is overlaid on the segment, or the equipment unit connected to the field-bus falls in a state of failure, sending out an improper waveform onto the segment, thereby causing occurrence of a communication trouble, this can exert adverse effects on all the other equipment units interconnected on the same segment as shown in FIG. 7, so that there can be a possibility that communication with the equipment units on the same segment is no longer possible at the worst, and a control operation by the controller will be stopped.

In order to preemptively prevent occurrence of such a situation described as above, a segment diagnostic function for diagnosing quality of communication of a segment to thereby give a warning to a user has been developed by respective venders. With the current state of the art, use of "destruction of frame data" as an index of the quality of communication of a field-bus segment is in the mainstream of the art.

However, since the "destruction of frame data" represents a phenomenon substantially at the same level as that for the communication trouble, and a distance from "detection to occurrence of the communication trouble" is very short, there exists a problem in that the destruction of frame data often cannot be used except for in a situation for finding the cause of the communication trouble, and therefore, cannot be used in techniques for predictive diagnosis on the communication trouble.

SUMMARY OF THE INVENTION

In order to solve the problem described in the foregoing, the invention has been developed, and it is therefore an object of the invention to achieve a communication quality diagnostic unit capable of detecting an omen phenomenon of a communication trouble early in a stage prior to actual emergence of the communication trouble due to a noise, thereby issuing a warning.

In order to solve problems described in the foregoing, the invention provides in its various aspects the following:

(1) A communication quality diagnostic unit for diagnosing quality of communication for transmitting and receiving frames at predetermined interval time, said unit comprising a frame-interval time detector for monitoring interval time between the frames, a frame-interval abnormality determiner for making determination as the case of diagnostic abnormality when a predetermined threshold value is exceeded by frame-interval time as detected, and a diagnostic abnormality notifier for notifying a host unit of the diagnostic abnormality as an alarm.

(2) The communication quality diagnostic unit under item (1) as above, wherein the frame-interval abnormality determiner sets at least one length of interval time as a first threshold value.

(3) The communication quality diagnostic unit under items (1) or (2) as above, wherein the number of the frames, exceeding the first threshold value, is set as a second threshold value.

(4) The communication quality diagnostic unit under item (1) as above, wherein the number of consecutive frames exceeding the first threshold value L1 is set as a third threshold value.

(5) The communication quality diagnostic unit under item (1) as above, wherein the frame-interval abnormality determiner removes interval time of a frame having interval time extending longer than a steady-state value in normal communication from objects of abnormal diagnosis.

(6) The communication quality diagnostic unit under item (1) as above, wherein the frame-interval time detector detects the frame-interval time on the basis of information on transmit, or receive completion time of a transmit-frame, or a receive-frame, and information on a data length of the receive-frame or the transmit-frame.

(7) The communication quality diagnostic under item (1) as above, wherein the frame-interval time detector detects the frame-interval time on the basis of information on transmit, or receive completion time of a transmit-frame, or a receive-frame.

(8) The communication quality diagnostic unit under item (1) as above, wherein the frame-interval time detector monitors transmit/receive frames on a field-bus in a communication environment where a plurality of equipment units connected to the field-bus communicate with one unit of a controller.

With the configuration of the invention, it is possible to expect advantageous effects as follows:

(1) Whether or not communication environment is proper can be determined at a level of an omen phenomenon prior to occurrence of frame destruction instead of at a level of a phenomenon equivalent to a communication trouble such as "communication frame destruction".

(2) As a result, the cause of a trouble can be investigated at an operation site, and maintenance/inspection schedule with sufficient leeway can be set up.

(3) Because determination on the frame-interval can be executed throughout field-bus communication carried out at a rate of 100 times per second, sampling interval can be set by far shorter than that in the case of conventional diagnostic techniques based on "receive-frame destruction". Hence, it is possible to shorten response time up to determination on abnormality.

BRIEF DESCRIPTION OF THE DRAWINGS

FIG. 3 is a time chart for describing the operation of the frame-interval time detector shown in FIG. 2;

FIG. 4 is a waveform chart for describing the operation of a frame-interval abnormality determiner;

FIG. 8(A) to 8(C) are waveform charts of frames on a field-bus, subjected to effects of a noise.

PREFERRED EMBODIMENT OF THE INVENTION

Figure 1:
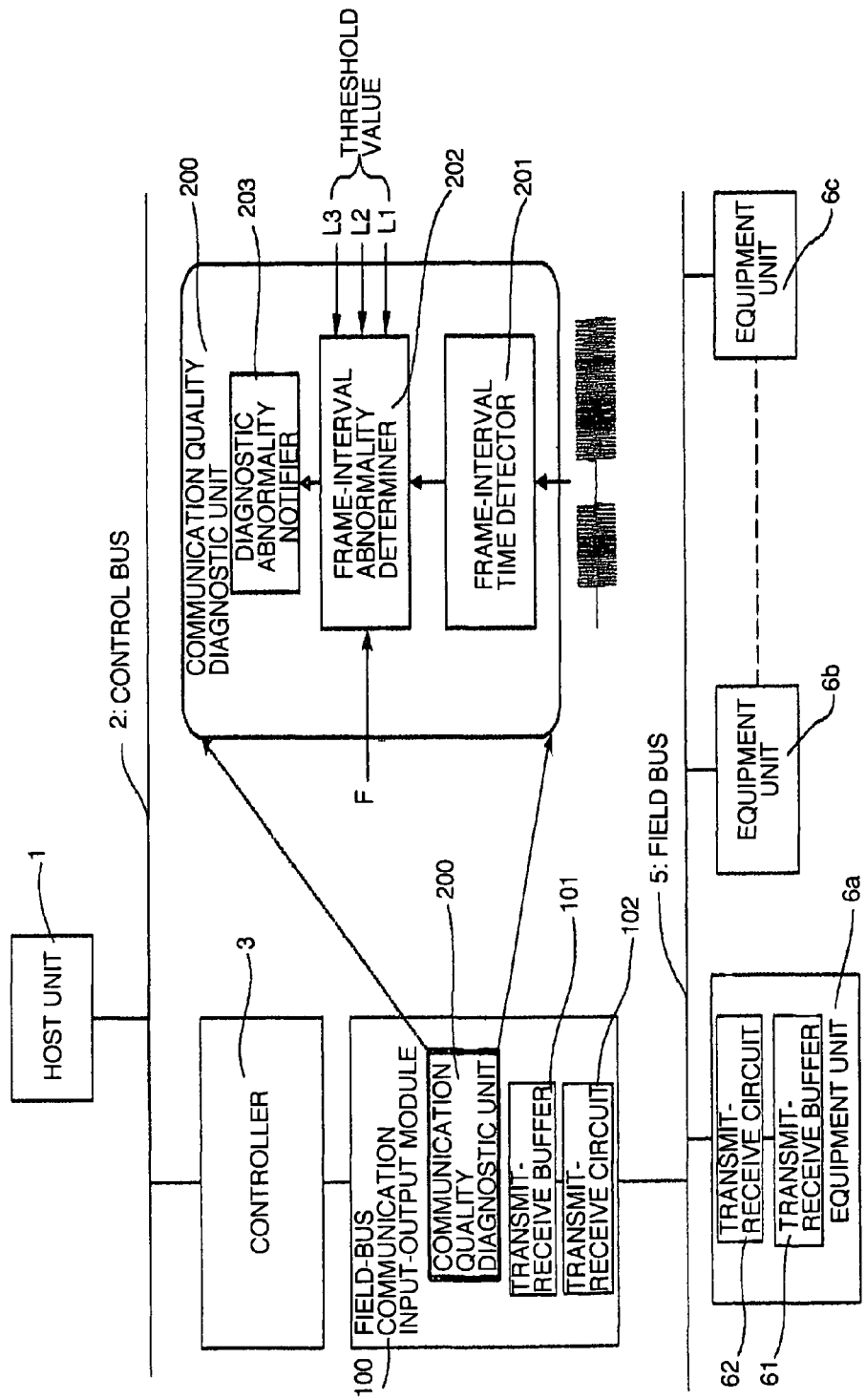
FIG. 1 is a functional block diagram showing one embodiment of a control system provided with a communication quality diagnostic unit according to the invention.
Figure 7:
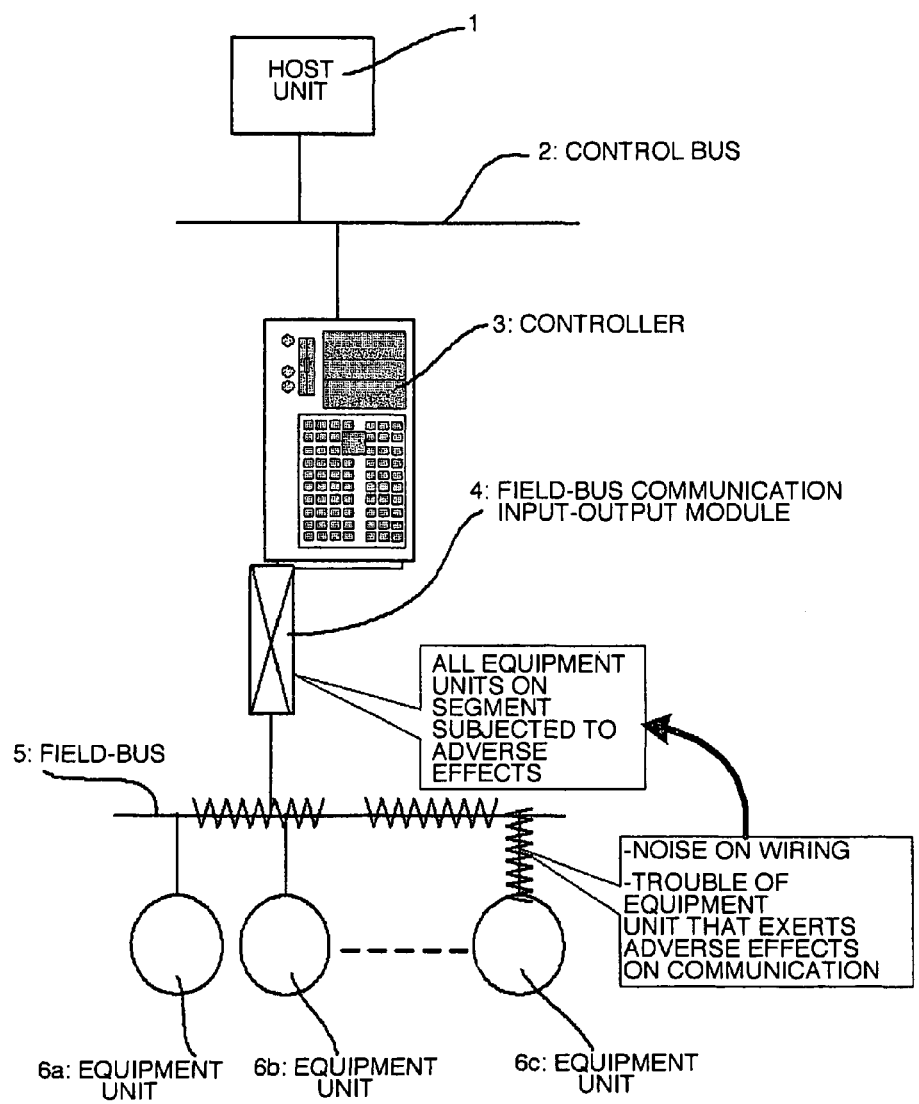
FIG. 7 is a functional block diagram showing one embodiment of a conventional control system.
Figure 9A:
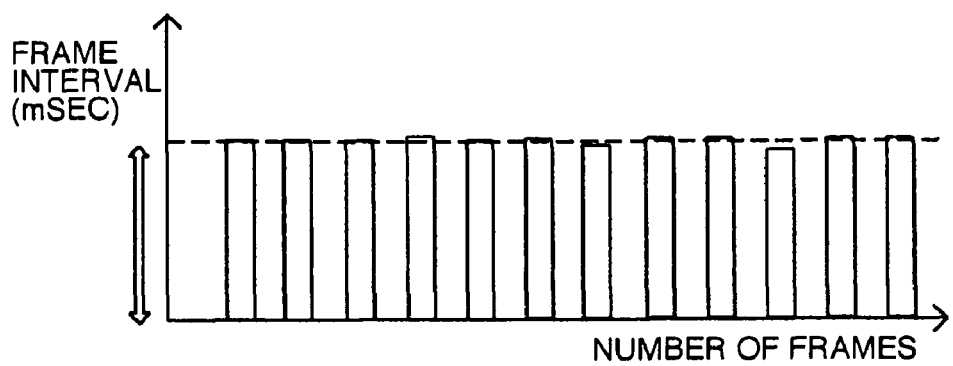
FIG. 9(A) and 9(B) are time charts each showing frame-intervals in disorder in a noise environment.
Figure 9B:
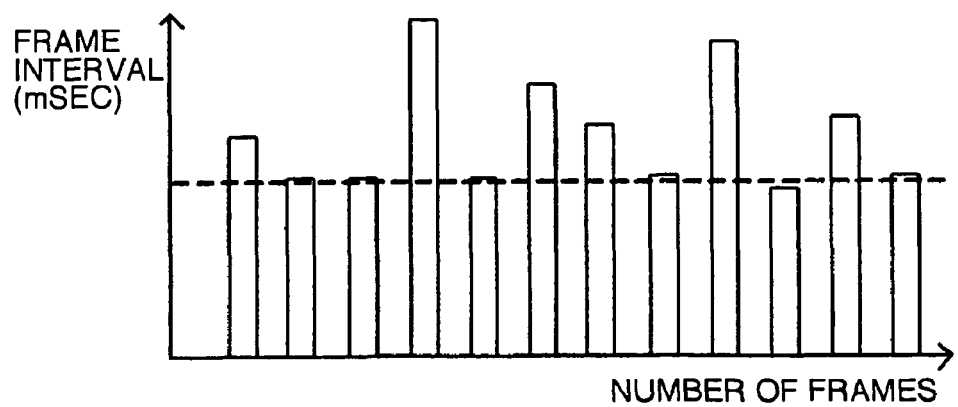

Embodiments of the invention are described in more details hereinafter with reference to the accompanying drawings. FIG. 1 is a functional block diagram showing one embodiment of a control system provided with a communication quality diagnostic unit according to the invention. In the figure, elements identical to those in the conventional control system described with reference to FIG. 7 are denoted by like reference numerals, omitting description thereof.

A field-bus communication input-output module 100 to which the invention is applied incorporates a communication quality diagnostic unit 200 therein, and is provided with a transmit-receive buffer 101, and a transmit-receive circuit 102, communicating with equipment units connected to a field-bus 5. An equipment unit 6a representative of the equipment units communicates with the field-bus communication input-output module 100 via a transmit-receive buffer 61, and a transmit-receive circuit 62, respectively.

The invention has a point in that quality of communication of a segment is diagnosed on the basis of frequency of variation occurring to a frame-interval, as a parameter. The communication quality diagnostic unit 200 has a functional makeup comprising a frame-interval time detector 201, a frame-interval abnormality determiner 202 and a diagnostic abnormality notifier 203, wherein the frame-interval time detector 201, and the frame-interval abnormality determiner 202 play the central role among those elements.

Now, there is described a technique for detection of frame-interval time by the frame-interval time detector 201 for monitoring frame-interval time. In general, with an external measuring instrument such as an oscilloscope, and so forth, a frame-interval time can be easily measured by observing a waveform from an end of transmit/receive to a start of the next transmit/receive.

In the case of the communication input-output module, however, timing for the start of the next transmit/receive is unnecessary for execution of communication, and if an attempt is made to detect the timing, a piece of hardware, unnecessary for an original job of the communication input-output module, will be required.

The invention has a feature in that the frame-interval time is detected by diverted use of a mechanism essential for a communication operation that is the original job of the communication input-output module without wasteful addition of the piece of hardware.

Figure 2A:
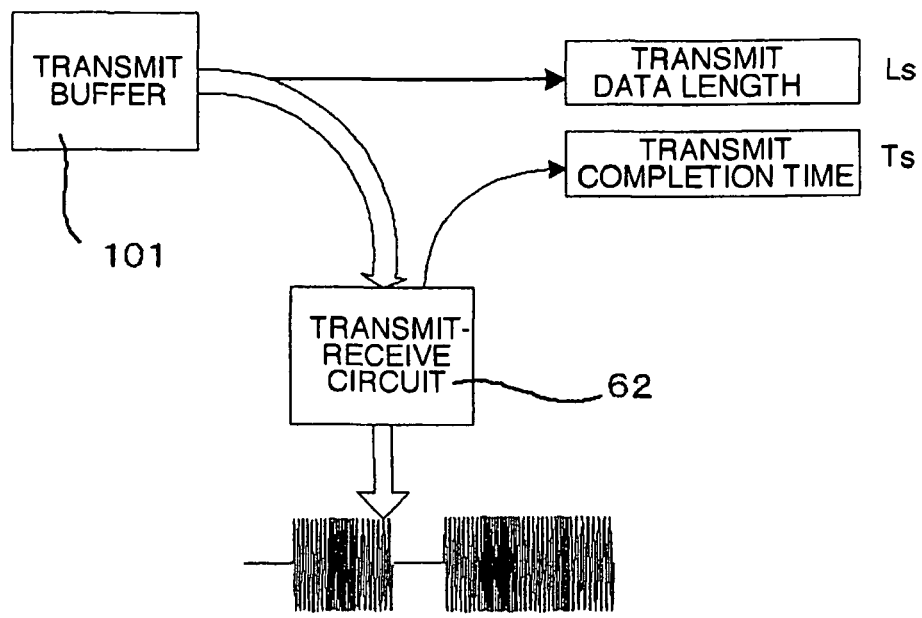
FIGS. 2(A) and 2(B) are functional block diagrams for describing operations of a frame-interval time detector.
Figure 2B:
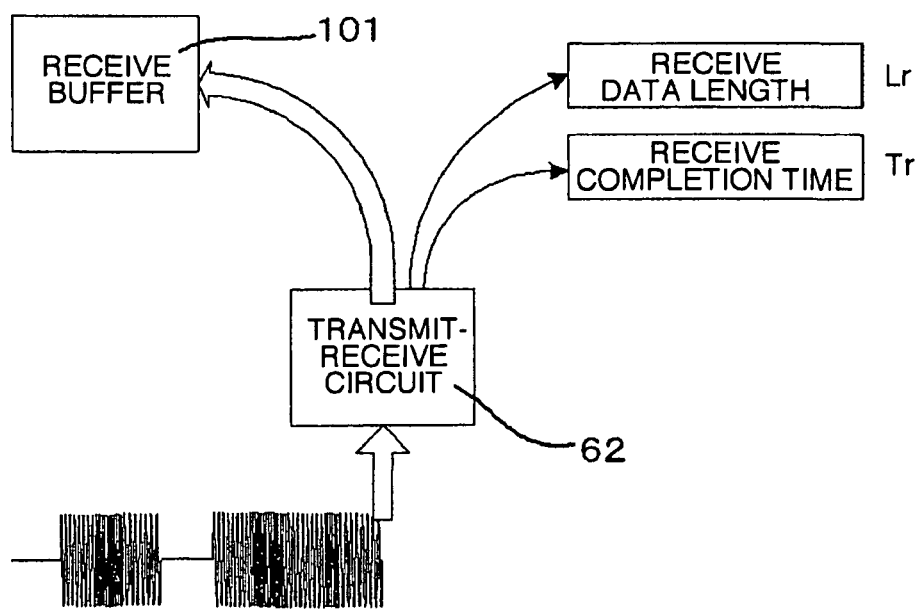

FIG. 2(A) and 2(B) are functional block diagrams for describing operations of the frame-interval time detector.

FIG. 2(A) shows the operation at the time of transmission from the field-bus communication input-output module 100 to the equipment unit 6a, and FIG. 2(B) shows the operation at the time of reception from the equipment unit 6a to the field-bus communication input-output module 100.

With the use of information obtained by those operation, that is, "transmit/receive data lengths" (Ls, Lr), and "transmit/receive completion time" (Ts, Tr), the frame-interval time is worked out as a difference obtained by subtracting ("the transmit/receive data lengths of the operation for this time"× "time per one data block") from (time difference between the transmit/receive completion time of the operation for this time, and transmit/receive completion time of the operation preceding thereto).

FIG. 3 is a time chart for describing the operation of the frame-interval time detector 201. By working out the frame-interval time Ti1, Ti2, Ti3, and Ti4 for the cases of transmit→receive, receive→transmit, receive→receive, respectively, on the basis of the time chart, the following holds:

$$Ti1 = Tr1 - Ts1 - Lr1*B \text{ (the case of transmit→receive sequence) (B: time per one data block)} \quad (1)$$

$$Ti2 = Ts2 - Tr1 - Ls2*B \text{ (the case of receive→transmit sequence)} \quad (2)$$

$$Ti3 = Tr2 - Ts2 - Lr2*B \quad (3)$$

$$Ti4 = Tr3 - Tr2 - Lr3*B \text{ (the case of receive→receive sequence)} \quad (4)$$

It therefore follows that it is possible to measure the frame-interval time in the case of any of combinations of transmit/receive. This technique also has an advantageous effect of expansion in detection object as compared with the conventional diagnostic technique based on "destruction of a received frame" that a sender himself is unable to detect at the time of a transmission operation.

Next, there is described hereinafter operation of the frame-interval abnormality determiner 202 for making determination as the case of diagnostic abnormality when a predetermined threshold value is exceeded by the frame-interval time detected by the frame-interval abnormality determiner 202. FIG. 4 is a waveform chart for describing the operation of the frame-interval abnormality determiner 202, indicating a state of variation in the frame-interval time during respective sampling periods T1 to T5.

In the frame-interval time detector 201, a first threshold value L1, a second threshold value L2, and a third threshold value L3, each serving as a determination criterion, are set, and the case where the number of the frames exceeding the first threshold value L1 is in excess of either the second threshold value L2, or the third threshold value L3 every sampling period is determined as the case of the diagnostic abnormality.

(1) Determination Threshold Value L1:

A tolerance range of deviation of frame-interval time is set. If the frame-interval time becomes greater beyond the range when compared with the results of theoretical computation according to the field-bus specification, such a case is to be included in candidate cases for determination as the case of the diagnostic abnormality. A plurality of stages may be set in the determination threshold value to thereby finely carry out management of risk candidates.

(2) Determination Threshold Value L2:

If the number of detections each showing the number of the frames exceeding the threshold value L1 is found to exceed a value set by L2, this is determined as the case of the diagnostic abnormality. If the threshold value L2 is set to, for example, 4, four of the frames are found exceeding the threshold value L1 in the sampling period T4 shown in FIG. 4, so that determination is made as the case of the diagnostic abnormality. Then, the number of the frames exceeding the threshold value L1 is les than four in others of the sampling periods, so that determination is not made as the case of the diagnostic abnormality.

(3) Determination Threshold Value L3:

If the number of consecutive frames exceeding the threshold value L1 is in excess of a value set by L3, this is determined as the case of the diagnostic abnormality. If the threshold value L3 is set to, for example, 3, three consecutive frames are found exceeding the threshold value L1 in the sampling period T2 shown in FIG. 4, so that determination is made as the case of the diagnostic abnormality. Since the number of the consecutive frames exceeding the threshold value L1 is les than three in others of the sampling periods, so that determination is not made as the case of the diagnostic abnormality.

(4) Exception in Determination By the Threshold Value:

The frame-interval abnormality determiner 202 acquires information on a frame F having interval time extended longer than a steady-state value from the within of the field-bus communication input-output module in normal communication, and removes the interval time of the frame F from objects of abnormal diagnosis.

If the diagnostic abnormality is determined by the frame-interval abnormality determiner 202, the diagnostic abnormality notifier 203 notifies the host unit 1 of a diagnostic result as an alarm via the controller 3 and the control bus 2.

The host unit 1 runs an application (not shown) for executing processing to cope with communication abnormality, and issues a command for a countermeasure based on the alarm received from the diagnostic abnormality notifier 203 to an operator.

The frame-interval time detector 201 has a mechanism whereby, if it is possible to acquire timing for the start/completion for transmit/receive, the frame-interval time can be directly detected instead of by the computation with the use of the respective frame lengths, described with reference to FIGS. 2, and 3.

Figure 5A:
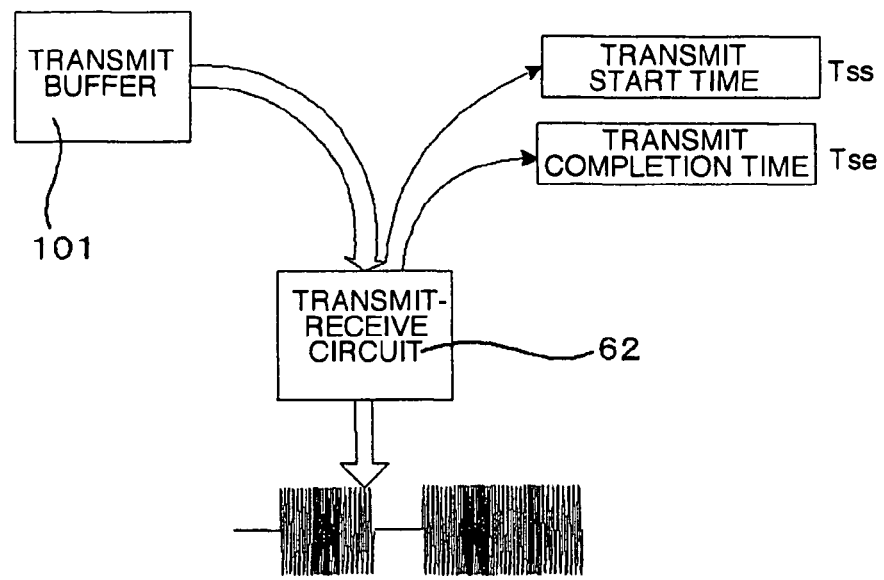
FIGS. 5(A) and 5(B) are functional block diagrams for describing operations of a frame-interval time detector according to another embodiment of the invention.
Figure 5B:
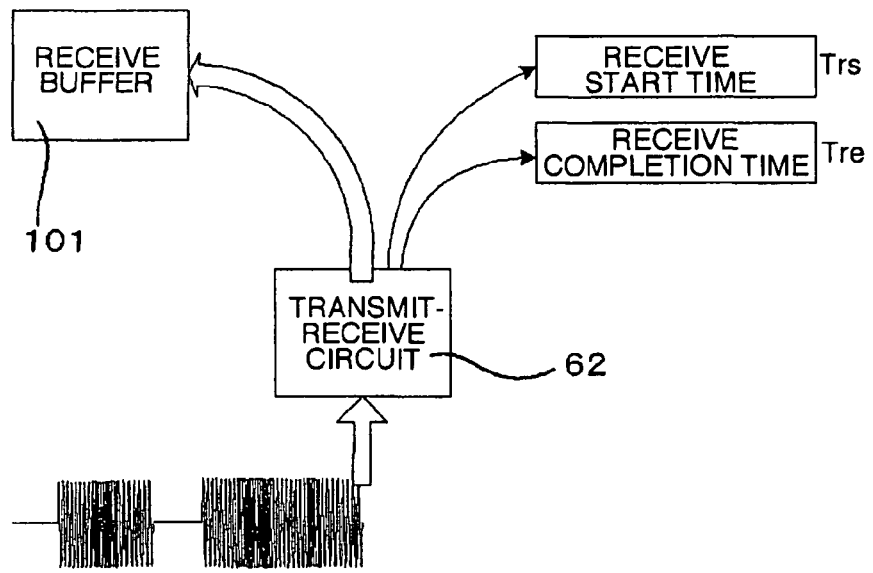
Figure 6:
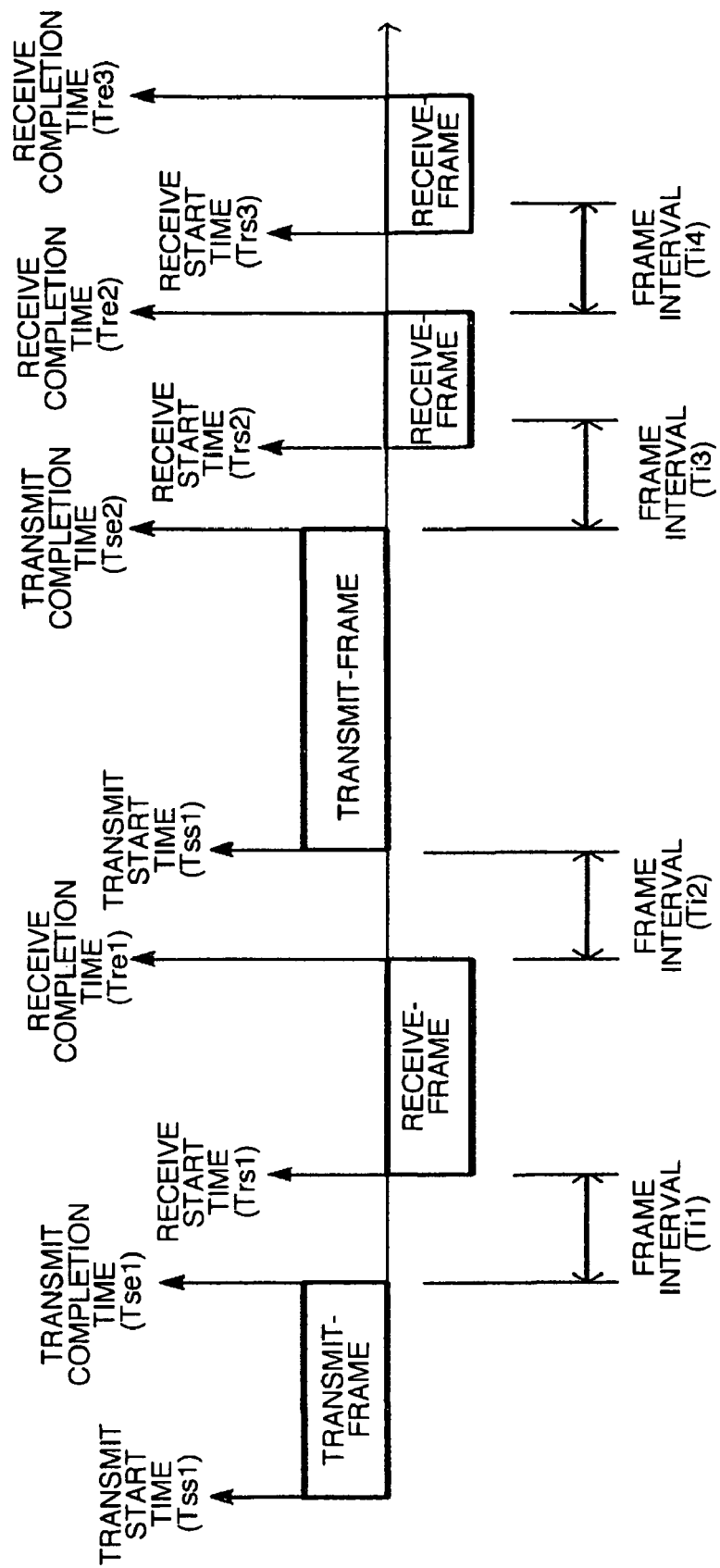
FIG. 6 is a time chart for describing the operation of the frame-interval time detector shown in FIG. 5.

FIG. 5(A) and 5(B) are functional block diagrams for describing operations of a frame-interval time detector according to another embodiment of the invention. FIG. 6 is a time chart for describing the operation of the frame-interval time detector shown in FIG. 5.

With the present embodiment of the invention, the frame-interval time in the respective cases of transmit→receive, receive→transmit, receive→receive, and transmit→transmit can be worked out by simple subtraction on the basis of information on transmit start time, transmit completion time, receive start time, and receive completion time, acquired at the time of operations for transmit and receive, respectively.

With the embodiments of the invention, described in the foregoing, there have been described examples of application of the embodiments to the process control system by the field-bus communication, however, it is to be pointed out that the invention is flexibly applicable to a communication quality diagnostic unit for diagnosing quality of communication in general whereby frames are transmitted/received at predetermined interval time.

What is claimed is:

1. A communication quality diagnostic unit for diagnosing quality of communication for transmitting and receiving frames at predetermined interval time, said unit comprising:

a frame-interval time detector for monitoring interval time between the frames, a frame-interval abnormality determiner for detecting the number of occurrence when a first threshold value representing at least one interval time is exceeded by the frame-interval time and making determination as the case of diagnostic abnormality when a second threshold value is exceeded by the number of occurrence as detected, and a diagnostic abnormality notifier for notifying a host unit of the diagnostic abnormality as an alarm, wherein the frame-interval time detector monitors transmit/receive frames on a field-bus used in a communication environment where a plurality of field equipment units connected to the field-bus used in a process control system for exchanging input/output of processes communicate with one unit of a controller, wherein the frame interval is a period having non-existence of frame.

2. The communication quality diagnostic unit according to claim 1, wherein the second threshold value is the number of consecutive frame interval exceeding the first threshold value.

3. The communication quality diagnostic unit according to claim 1, wherein the frame-interval abnormality determiner removes interval time of a frame having interval time extending longer than a steady-state value in normal communication from objects of abnormal diagnosis.

4. The communication quality diagnostic unit according to claim 1, wherein the frame-interval time detector detects the frame-interval time on the basis of information on transmit, or receive completion time of a transmit-frame, or a receive-frame, and information on a data length of the receive-frame or the transmit-frame.

5. The communication quality diagnostic unit according to claim 1, wherein the frame-interval time detector detects the frame-interval time on the basis of information on transmit, or receive completion time of a transmit-frame, or a receive-frame.

6. The communication quality diagnostic unit according to claim 1, wherein the frame-interval abnormality determiner makes determination as the case of diagnostic abnormality every sampling period.

7. The communication quality diagnostic unit according to claim 1, wherein the field bus is two-wire bus-feed type digital communication.

8. The communication quality diagnostic unit according to claim 1, wherein one of the field equipment units is a thermometer, a pressure transmitter and valve positioner.

* * * * *